US011100512B1

(12) United States Patent
Catsifas et al.

(10) Patent No.: US 11,100,512 B1
(45) Date of Patent: Aug. 24, 2021

(54) TEXT SAVINGS

(71) Applicant: UIPCO, LLC, San Antonio, TX (US)

(72) Inventors: Christine Catsifas, San Antonio, TX (US); Meagan Trahan, San Antonio, TX (US); Ingeborg Burch, San Antonio, TX (US); Jeremy Michael Grant, San Antonio, TX (US); Sara S. Galvin, Pacifica, CA (US); Luke James Gradeless, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 176 days.

(21) Appl. No.: 15/983,919

(22) Filed: May 18, 2018

Related U.S. Application Data

(60) Provisional application No. 62/508,519, filed on May 19, 2017.

(51) Int. Cl.
*G06Q 20/40* (2012.01)
*G06Q 20/32* (2012.01)
*G06Q 20/10* (2012.01)
*H04W 4/12* (2009.01)

(52) U.S. Cl.
CPC ........ *G06Q 20/405* (2013.01); *G06Q 20/108* (2013.01); *G06Q 20/3255* (2013.01); *H04W 4/12* (2013.01)

(58) Field of Classification Search
CPC .... G06Q 20/00; G06Q 20/405; G06Q 20/108; G06Q 20/3255; H04W 4/14; H04W 4/12
See application file for complete search history.

(56) References Cited

U.S. PATENT DOCUMENTS

| 8,489,456 | B2 * | 7/2013 | Burgess | G06Q 30/02 705/14.1 |
| 8,527,413 | B2 * | 9/2013 | Heller | G06Q 20/102 705/35 |
| 10,074,091 | B2 * | 9/2018 | Crawford | G06Q 20/227 |
| 10,169,820 | B2 * | 1/2019 | Narayana | G06Q 40/06 |

* cited by examiner

*Primary Examiner* — Scott C Anderson
*Assistant Examiner* — Marla Hudson
(74) *Attorney, Agent, or Firm* — Perkins Coie LLP

(57) ABSTRACT

Saving funds allows users to be prepared for emergencies and unexpected costs. In some embodiments, a text savings plan saves money by automatically identifying and transferring small amounts of money from a user's first account (e.g., checking account) to the user's second account (e.g., savings account, payee account). The text savings plan determines and transfers amounts based at least in part on the balance of the user's first account.

20 Claims, 12 Drawing Sheets

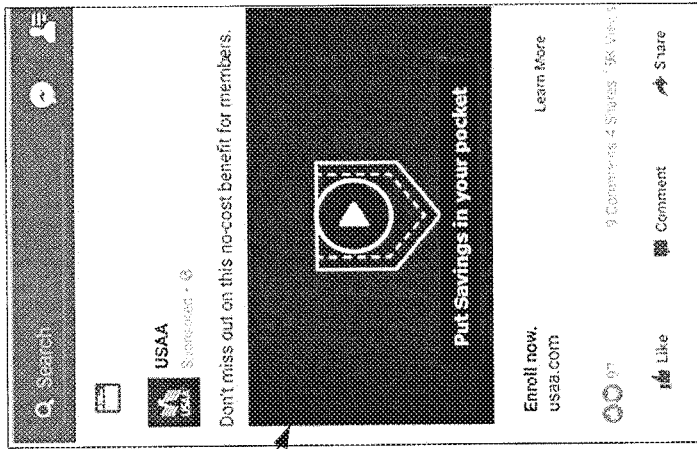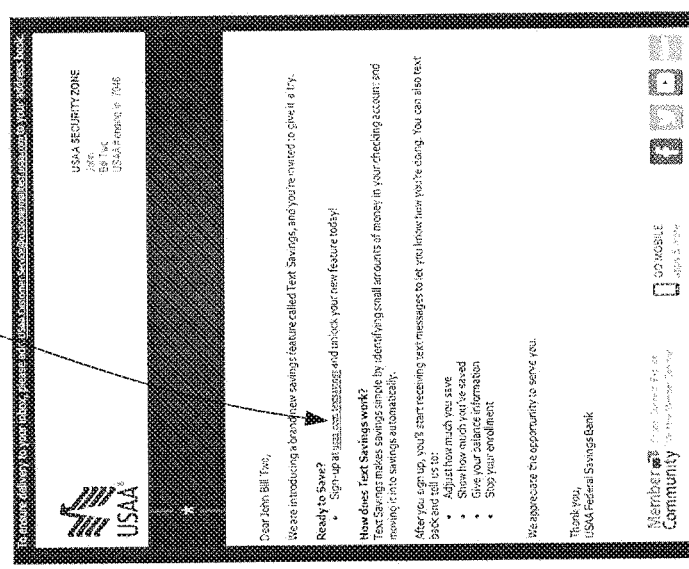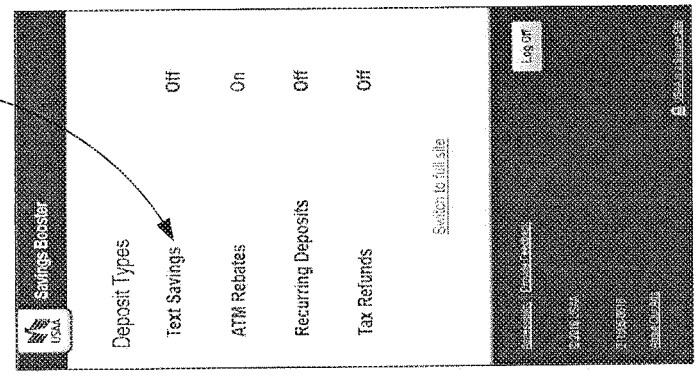
FIG. 5

| Command List | Action |
|---|---|
| Total Saved | Displays total amount saved from sign-up |
| Bal | Displays checking accout balance |
| Save More | Increases the amount saved by 1 tier (1 time on |
| Savings | Displays savings account balance |
| Help | Displays list of commands |
| Last Transfer | Displays last amount transferred |
| Stop | Opts member out of experience |
| Other | Dispalys secondary list of commands |
| Save Now (amount) | Transfers (amount) from checking to savings |
| History | Displays last 3 transfers |
| Checking | Displays checking account balance |
| Save Less | Decreases amount saved by 1 tier (1 time only) |
| Thanks/Thank you | Disaplys your welcome message |
| Hi/Hey/Hello | Disaplys hello message |

FIG. 10

TEXT SAVINGS

CROSS-REFERENCE TO RELATED APPLICATIONS

This application is a non-provisional of and claims priority to U.S. Provisional Application No. 62/508,519, filed May 19, 2017, entitled "TEXT SAVINGS," which is hereby incorporated by reference in its entirety for all purposes.

TECHNICAL FIELD

Various embodiments of the present technology generally relate to enrolling a user in a savings plan, funding the savings account, and managing the savings plan.

BACKGROUND

Saving money on a regular basis is difficult for many people. Part of the difficulty in saving money is that many people cannot or simply do not save large amounts at one time. In addition, some people think of savings in terms of the amount in their bank account that is left over at the end of the month. But, by the end of the month, their accounts have been exhausted to the point that it is difficult to save money. As a result, many people have insufficient savings to deal with emergencies and unexpected costs.

BRIEF DESCRIPTION OF THE DRAWINGS

Embodiments of the present technology will be described and explained through the use of the accompanying drawings in which:

FIG. 5 illustrates examples of web-based applications used to enroll in a text savings plan;

FIG. 10 illustrates examples of commands that can be used in accordance with a text savings platform;

DETAILED DESCRIPTION

Various embodiments of the present technology generally relate to a savings plan that removes efforts to save money. Many people struggle to save money in any amount. Moreover, many people are unaware of how much money they have in a savings account. In some embodiments, a text savings plan assists users with saving money by automatically identifying and transferring small amounts of money from a user's first account, such as a checking account to the user's second account, such as a savings account or investment account. The text savings plan can determine and transfer amounts based on a user's checking account balance. In some embodiments, the text savings plan engages the bank members with regular (e.g., daily) text updates to create a greater financial awareness.

In some embodiments, the system can determine the amount to transfer based on a plurality of tiers. Each tier can correspond to a different range of account balances with a base transfer amount plus or minus a second amount. The second amount can be randomly determined by the system within the tier. In some embodiments, the system can include a taxonomy of commands such that the user can, among other actions, transfer additional funds, with a simple command in a text message. In some embodiments, the user can disenroll from the text savings service by sending a text message.

This disclosure describes efficient money transfer processes designed to reduce inefficiencies in current money transfer systems and to assist users with savings. Various embodiments may provide one or more of the following technological improvements: (1) improved efficiency in banking processes by transferring money via text messages; (2) automatic and periodic transfer of amounts based on tiers associated with an account balance; (3) adjustment of transfer amount by using text messaging; and (4) obtaining information for a savings plan or other plan via text messages.

Although the disclosure uses the example of transferring funds from a checking account to a savings account, other transfers are contemplated. For example, funds can be transferred to pay down bills (e.g., credit card bill, car payment, insurance) or transferred to an investment account. In some embodiments, the account receiving the funds can be based on a status of the account (e.g., credit card bill over a certain amount, due date of a bill) and can be dispersed to more than one account.

Figure 1:
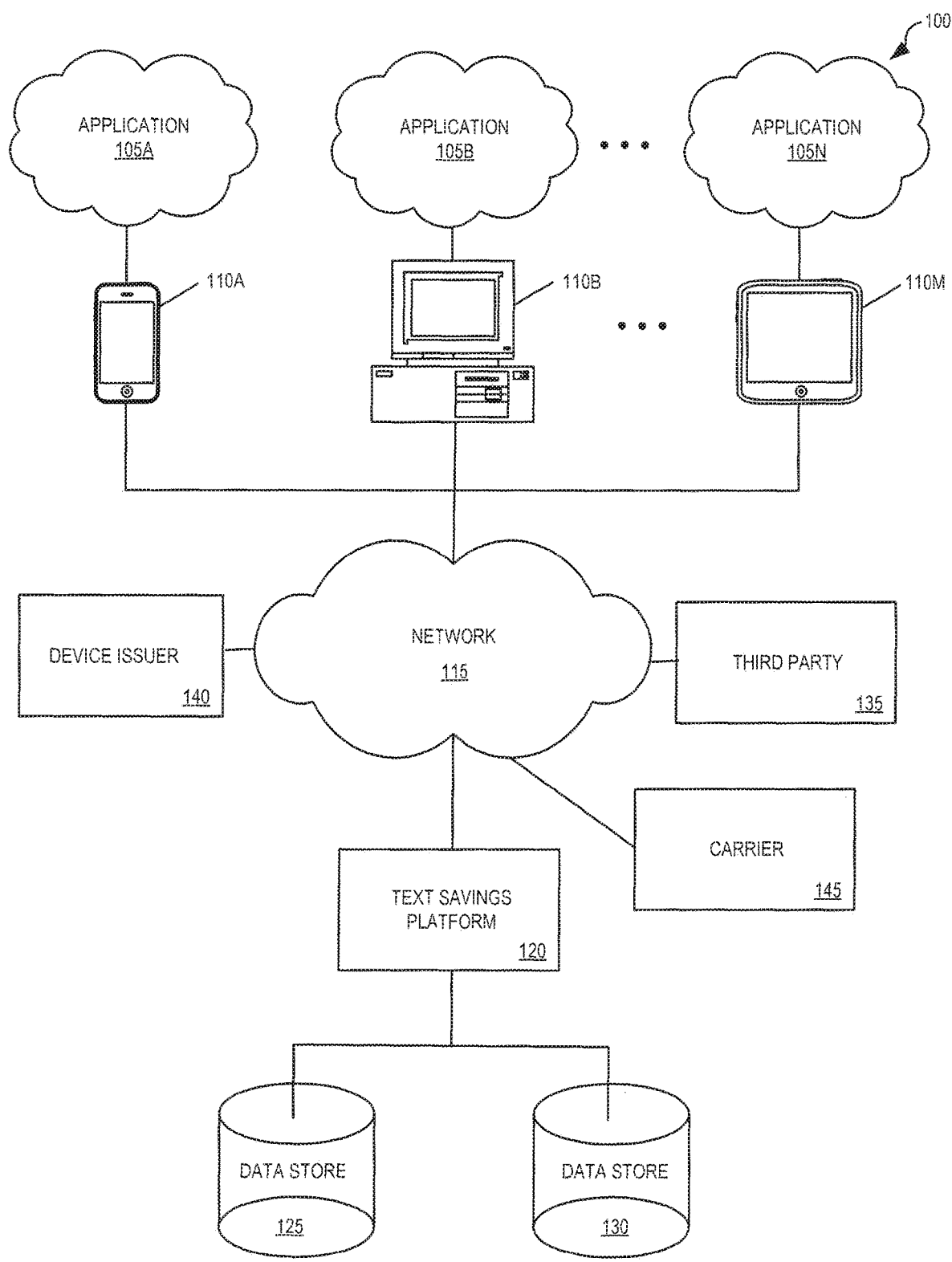
FIG. 1 illustrates an example of an operating environment in accordance with various embodiments of the present disclosure.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices may include mechanisms for receiving and sending traffic by connecting through network 115 to third party 135, device issuer 140, carrier 145, text savings platform 120, and data stores 125 and 130.

Computing devices 110A-110M may be configured to communicate via the network 115 with text savings platform 120. In some embodiments, computing devices 110A-110M may retrieve from or submit information to text savings platform 120 and run one or more applications with customized content retrieved by text savings platform 120 and data stores 125 and 130. For example, computing devices 110A-110M may execute a browser application or a customized client to enable interaction between the computing devices 110A-110M, text savings platform 120, and data stores 125 and 130.

Network 115 can be any combination of local area and/or wide area networks using wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol Security (IPsec).

Text savings platform 120 runs on one or more computing devices, such as one or more servers, and may be used to receive text messages from one or more computing devices 110A-110M, determine an identity of the user sending the text messages (e.g., via identifying information from the computing device sending the text message), execute a method of enrolling or disenrolling a user from a text savings plan, determine an amount to transfer from a first account to a second account, determine the frequency of transferring an amount from a first account to a second account, analyze received text messages and transfer additional amounts from a first account to a second account, analyze received text messages and either increase or decrease a transfer amount, analyze received text messages and send text messages to one or more computing devices 110A-110M with requested information, store profiles and/or policies in data stores 125 and 130, and/or perform other activities. In some embodiments, text savings platform 120 is a computing device, such as a server.

Text savings platform 120 may be communicably coupled with third party 135, device issuer 140, carrier 145, data stores 125 and 130 and computing devices 110A-110M and may communicate, access, or receive data (e.g., device information, authentication information) from third party 135, computing devices 110A-110M and data stores 125 and 130. Text savings platform 120 may be associated with a membership organization (e.g., a financial institution or an insurance company), and the users of the computing devices 110A-110M may be members of the membership organization.

Data stores 125 and 130 can be used to manage storage and access to user data such as automated savings history, user initiated savings history, logon history, registered devices, information relating to the registered devices (e.g., when the device was registered, whether the mobile application is downloaded on the device, networks the device connects to), user preferences, location information, security questions and answers, and other information. Data stores 125 and 130 may be data repositories of a set of integrated objects that are modeled using classes defined in database schemas. Data stores 125 and 130 may further include flat files that can store data. Text savings platform 120 and/or other servers may collect and/or access data from the data stores 125 and 130.

Third party 135 may be any type of service to identify devices, carriers, networks, device issuers; send push notifications or text messages; perform biometric identification or verification services; and/or provide other functions related to identity and verification management. In some embodiments, third party 135 may collect data and provide the data to text savings platform 120. In an example, third party 135 may use characteristics of the call or text message to determine an identity of the carrier 145 of the call or text message and can request the carrier of the call or text message to provide information relating to the device (e.g., the device issuer).

Carrier 145 may be a carrier of the call (e.g., AT&T, Verizon). Carrier 145 may have information regarding device issuer 140, the issuer of the device.

FIG. 1 shows an embodiment for a system for transferring funds to an account. The system can include a first computing device 110A, such as a mobile phone, and a second computing device, such as a text savings platform 120. The first computing device communicates with the second computing device using, for example, the internet or cellular networks 115. The first computing device includes memory and processor to store and execute instructions that allow the first computing device to receive from a user a response to enroll in a savings plan, transmit a text message from the first computing device to the second computing device to confirm the user's enrollment in the savings plan; and receive and display an acknowledgement text message from a second computing device acknowledging that the user has enrolled in a text savings plan. As discussed below, the first computing device can also transmit multiple text messages to the second computing device to request additional information about the user's various financial accounts, to adjust the automatic savings amount, or to request additional savings.

The second computing device includes memory and processor to store and execute instructions that allow the second computing device to receive text messages from the first computing device including the text message that confirms the user's enrollment in the savings plan. The second computing device initiates the saving plan for the user after receiving the user's enrollment confirmation text message. The second computing device also determines an amount of money to transfer from a first account to a second account. In an embodiment, the second computing device determines an amount to transfer based on, for example, the amount in the user's checking account. In an embodiment, the amount transferred may be in the range of $1 to $9. One benefit of having small amounts transferred from, for example, a checking account to a savings account is that the users likely will not feel a financial impact on their monthly or weekly budgets. Another benefit of transferring small amounts is that a user's disposable income is not as high as the user expects, which can help the user spend less on non-necessities.

The second computing device can also determine and transfer an amount periodically from the first account to the second account. In some embodiments, the second computing device periodically transfers an amount from one account to another, for example, up to a certain number of times in a time period (e.g., two times a week).

Figure 2:
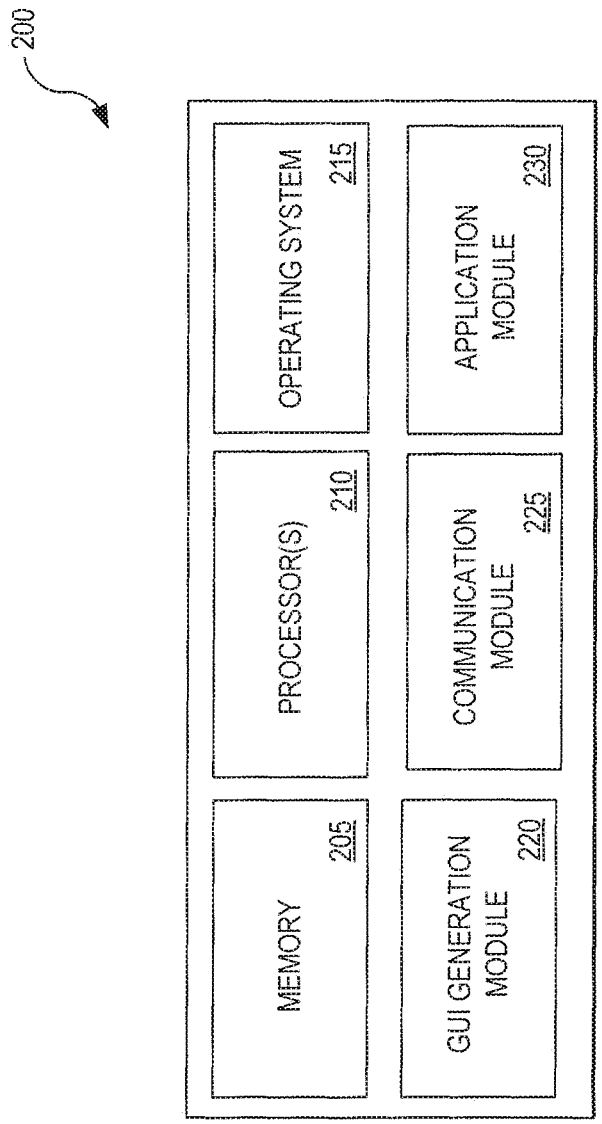
FIG. 2 illustrates an example of a block diagram of a user's computing device.

FIG. 2 illustrates a set of components 200 within a user's computing device 110A-110M according to one or more embodiments of the present disclosure. The user's computing devices 110A-110M sends text messages to and receives text messages from the text savings platform 120. According to the embodiments shown in FIG. 2, computing device 110 can include memory 205, one or more processors 210, operating system 215, GUI generation module 220, communication module 225, and application 230. Other embodiments of the present technology may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of operating system 215, GUI generation module 220, communication module 225, and application 230. Generally, memory 205 can include any device, mechanism, or populated data structure used for storing information. In accordance with some embodiments of the present disclosure, memory 205 can encompass, but is not limited to, any type of volatile memory, nonvolatile memory (RAM), and dynamic memory. For example, memory 205 can be random access memory, memory storage devices, optical memory devices, magnetic media, floppy disks, magnetic tapes, hard drives, single in-line memory modules (SIMMs), synchronous dynamic random access memory (SDRAM), dual in-line memory modules (DIMMs), Rambus dynamic random access memory (RDRAM), double data rate RAM (DDR RAM), small outline DIMMs (SODIMMs), EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 230 that allow a user to access and interact with text savings platform 120. For example, application 230 can include an application for financial services, a money transfer application, a social networking application, and a gaming application.

GUI generation module 220 can generate one or more graphical user interface (GUI) screens that allow for interaction with a user. In at least one embodiment, GUI generation module 220 generates a GUI for receiving and/or conveying information (e.g., information relating to account balances or transfers) to the user's computing device. GUI generation module 220 on a user's computing device can display a GUI providing data and including one or more embedded triggers that detect the user interaction.

Communication module 225 facilitates communication (e.g., in the form of voice, and/or data, such as text messages) with electronic devices, one or more servers of an organization, such as the text savings platform 120, and mobile application programs via wireless communication methods such as cellular communication, near field communication (NFC), Bluetooth, and Wi-Fi. In some embodiments, communication module 225 can receive and/or transmit session-specific codes from/to a server when a user intends to continue a data exchange. In some embodiments, communication module 225 can simultaneously maintain voice/data communications over different channels.

Application 230 can access a server and/or a platform associated with an organization (e.g., text savings platform 120) to display account data, enroll and disenroll user from a text savings plan, request the text savings platform 120 to either increase or decrease a transfer amount. In some embodiments, the application 230 may access the text savings platform 120 to retrieve certain information or perform certain operation by sending and receiving text messages. Generally, text messages sent by a user's computing device put into motion the changes implemented in the text savings platform 120. Thus, users can save in small increments and adjust how much they saved automatically with no human activity on the sending or receiving side of the text message.

Figure 4:
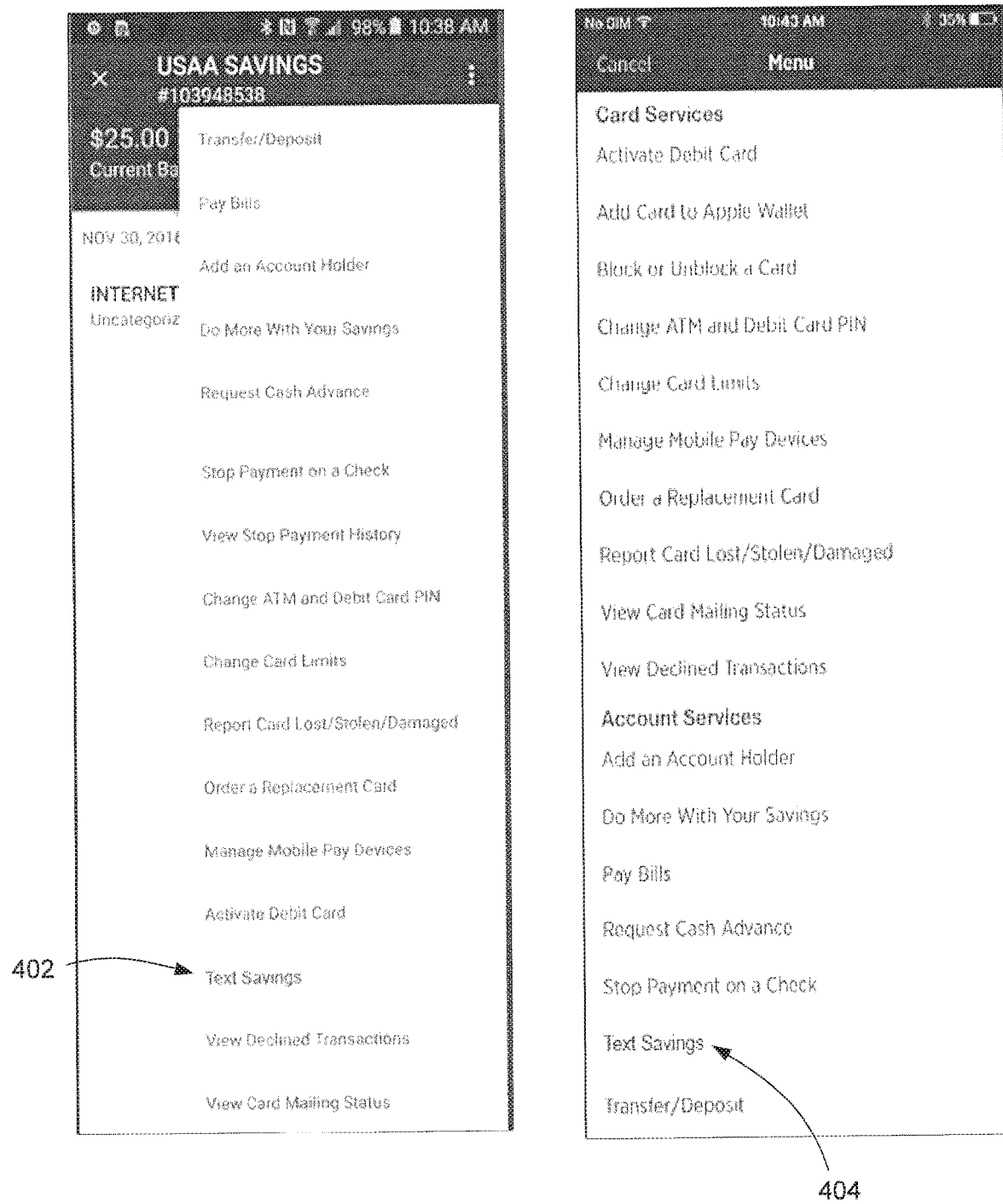
FIG. 4 illustrates examples of options to enroll in a text savings using an application on a mobile device.

FIGS. 4 and 5 show options for a user to enroll in a text savings plan. For example, FIG. 4 illustrates examples of options to enroll in a text savings using an application on a mobile device. A user initiates the process of enrolling in a text savings plan by selecting text savings icon 402, 404 in the mobile device application. Similarly, FIG. 5 illustrates examples of web-based applications used to enroll in a text savings plan. A user may use a web-based application to initiate a process of enrolling in the text savings plan by selecting text savings icon 502 or clicking on a link 504 for signing up for text savings or clicking on a link 506 from a social media platform to enroll in text savings.

Figure 6:
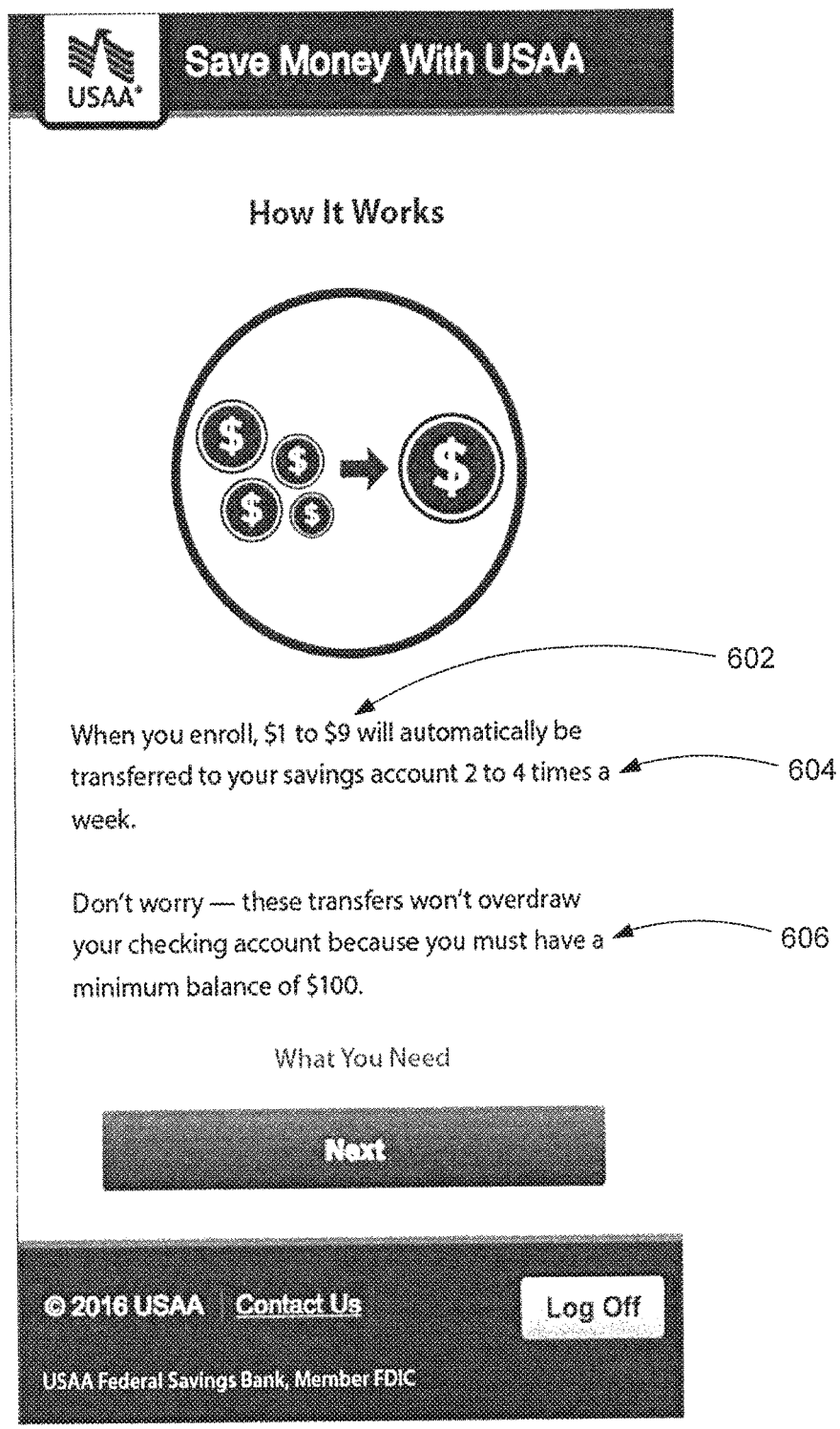
FIG. 6 illustrates an example of an introductory screen on a user's computing device to acquaint the user with certain features of the text savings plan.

FIG. 6 illustrates an introductory screen on a user's computing device to acquaint the user with certain features of the text savings plan. In an embodiment, the user may be informed of features of the text savings plan such as automatic transfer 602 of $1 to $9 from the user's checking account to the user's savings account. Further, the user may also be informed that the automatic transfers can be periodic 604, such as two to four times a week. Further, a user may be informed of certain minimum balance needed 606 in the user's checking account, for example, $100, for the text savings plan to transfer money.

Figures 7A, 7B:
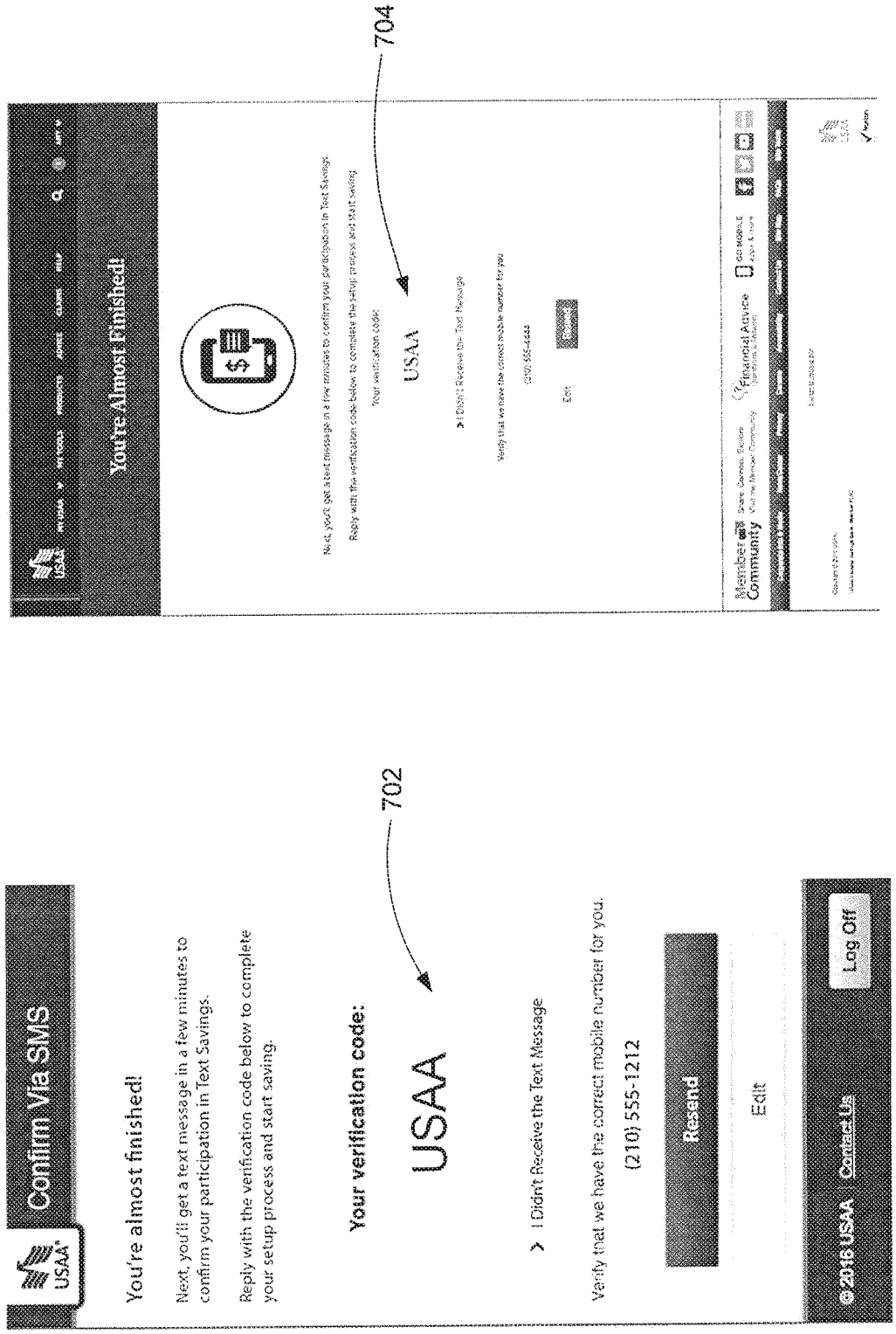
FIG. 7A illustrates an example of confirmation of enrollment step on a user's mobile device.
FIG. 7B illustrates an example of confirmation of enrollment step on a user's desktop or laptop.

FIGS. 7A-7B illustrates a confirmation of enrollment step on a user's computing device. In an embodiment, the text savings platform 120 finalizes the enrollment process by requesting the user's computing device to send text message to the text savings platform 120 with a provided verification code 702, 704. In some embodiments, when a user uses his or her mobile device to enroll in the text savings plan, the mobile device receives the verification code and the user's mobile phone is prompted to send the verification code 702 to the text savings platform 120 using a text message. Once the user's computing device sends a text message with the verification code to the text savings platform 120, the user is enrolled in the text savings plan.

Figure 8:
FIG. 8 illustrates an example process of disenrolling in a text savings plan.

FIG. 8 illustrates a process of disenrolling in a text savings plan. A user's computing device sends a text message to the text savings platform 120 to disenroll in the text savings plan. For example, the user's computing device may send a text message that may say "Stop" 802 to disenroll from the text savings plan. In response, the text savings platform 120 may send information 804 back to the user's computing device to inform that the user has been disenrolled from the text savings plan and any additional text messages from the text savings platform 120. In some embodiments, a user's computing device may send a text message to turn off text messages from the text savings platform 120, however the user is still enrolled in the text savings plan. Alternatively, in some embodiments, a user's computing device may send a text message to disenroll from the text savings plan, but the user's computing device may keep receiving informational text messages from the text savings platform 120.

Figure 3:
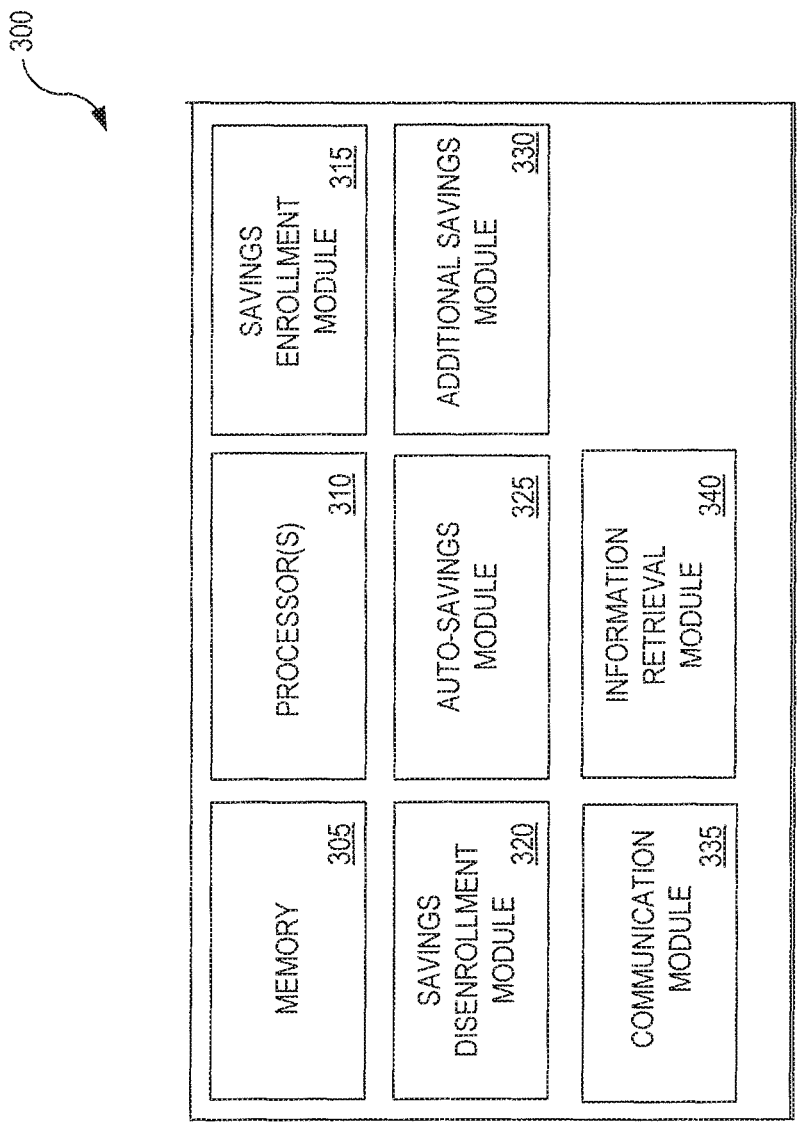
FIG. 3 illustrates an example of a block diagram of a text savings platform.

FIG. 3 illustrates a set of components 300 within a system such as a text savings platform 120 according to one or more embodiments of the present disclosure. In some embodiments, these components can be included in a server maintained by the entity that owns and operates text savings platform 120. According to the embodiments shown in FIG. 3, text savings platform 120 can include memory 305, one or more processors 310, savings enrollment module 315, savings disenrollment module 320, auto-savings module 325, additional savings module 330, communication module 335, and information retrieval module 340. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information, as described above for memory 205. Memory 305 can store instructions for running one or more applications or modules on processor(s) 310. For example, memory 305 could be used in one or more embodiments to house all or some of the instructions needed to execute the functionality of savings enrollment module 315, savings disenrollment module 320, auto-savings module 325, additional savings module 330, communication module 335, and information retrieval module 340.

Savings enrollment module 315 allows a user to enroll in and initiate the text savings plan. As shown in FIGS. 4-7, and discussed above, a user can use a computing device to enroll in the text savings plan.

Savings disenrollment module 320 allows a user to disenroll from the text savings plan. As shown in FIG. 8, and discussed above, a user's computing device sends a text message to the text savings platform 120 to disenroll from the text savings plan.

The auto-savings module 325 allows the text savings platform 120 to determine the amount of money to transfer from the user's first account, such as a checking account, to the user's second account, such as a savings account. The auto-savings module 325 periodically determines during a period of time the amount to transfer and based on an account balance in the user's first account. In some embodiments, the auto-savings module 325 determines the amount to transfer on a day, for example, Monday of a week, based on the account balance in the user's first account on another day, for example, Friday of the previous week. Each time the auto-savings module 325 determines an amount to transfer, the auto-savings module 325 also transfers the amount to the user's second account. Thus, the auto-savings module 325 also periodically transfers during a period of time the determined amount to the user's second account. When the auto-savings module 325 transfers an amount from the user's first account to the user's second account, the text savings platform 120 may send a text message to the user's computing device to inform the user that the transaction has been completed.

Figure 9:
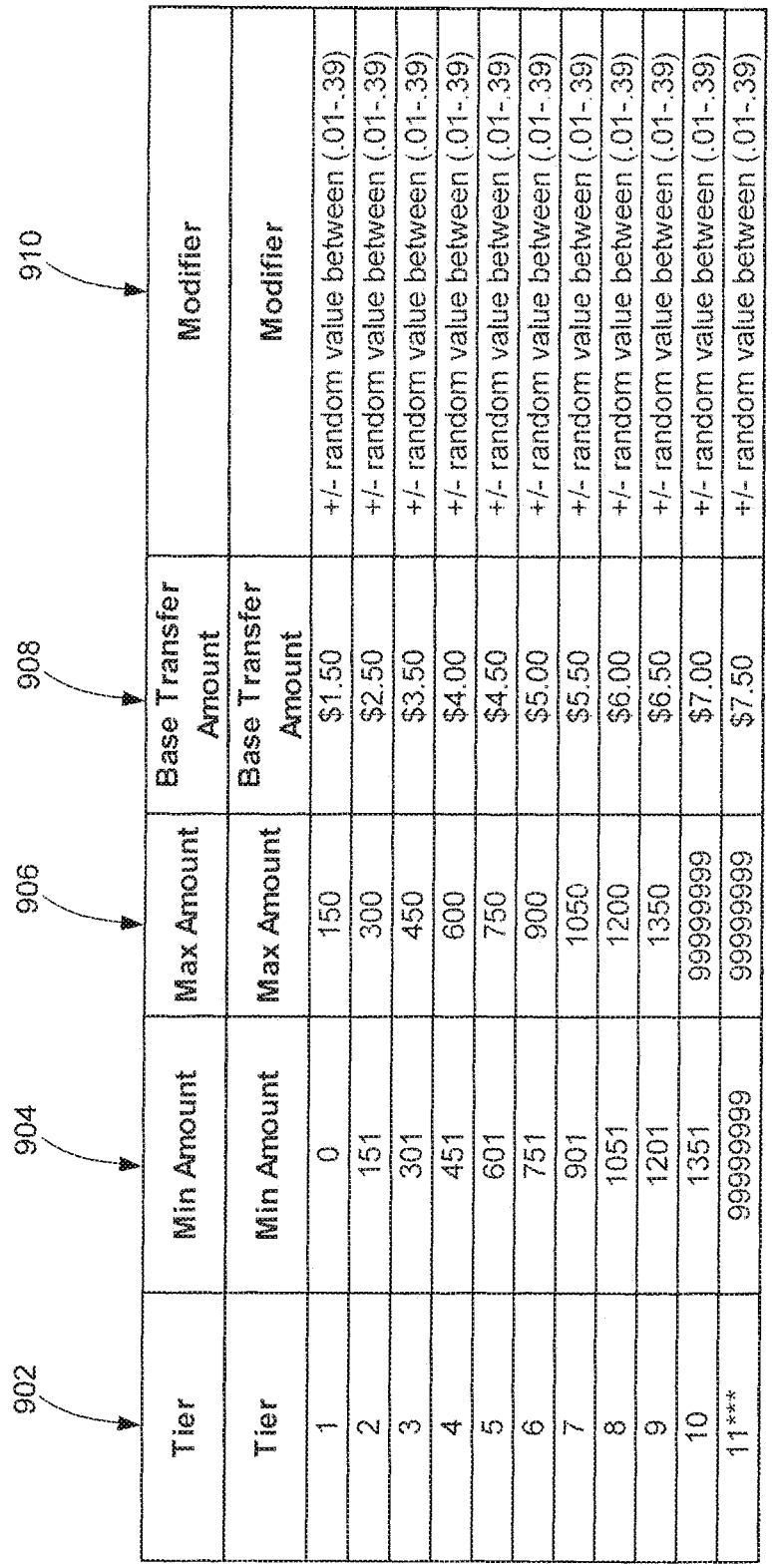
FIG. 9 illustrates examples of tiers used to determine a transfer amount.

The auto-savings module 325 also determines the amount to transfer based on multiple tiers associated with multiple ranges of account balances. FIG. 9 illustrates examples of tiers 902 used to determine a transfer amount. Each tier 902 corresponds to a different range of account balance or a different range of minimum amount 904 and maximum amount 906. Based on a user's account balance, the auto-savings module 325 determines the applicable tier 902 used to determine the transfer amount. The transfer amount corresponding to an applicable tier 902 may be a base transfer amount 908 combined with a random amount 910. In some embodiments, the base transfer amount 908 may be combined with a random amount 910 by either adding the two numbers, or subtracting the two numbers. The auto-savings module 325 may randomly determine whether to add or to subtract the base transfer amount and the random amount. For example, if a user has $350 in his or her checking account, the auto-savings module 325 determines that Tier 3 corresponds to the user's checking account balance. As a result, the auto-savings module 325 determines that the transfer amount may be a base amount of $3.50 added to or subtracted from a random amount, which may be between 1 cent and 39 cents inclusive. The tiers and amounts shown in FIG. 9 are non-limiting examples. In some embodiments, the tiers and amounts vary with attributes of the user and/or with an analysis of the current financial situation of the user.

The auto-savings module 325 also allows the text savings platform 120 to transfer an amount using either a higher tier or a lower tier than the tier associated with a user's account balance. In some embodiments, a user sends a text message using the first computing device, such as a mobile device, to the second computing device, such as the text savings platform 120, to instruct or command the second computing device to either increase the savings amount by one tier or decrease the savings amount by one tier. Continuing with the example discussed above, if a user has $350 in his or her checking account, the user's computing device may instruct the text savings platform 120 to save a higher amount by sending a text message with the words "Save More." When the text savings platform 120 receives the text message, the auto-savings module 325 determines a transfer amount using a higher tier, for example, Tier 4. Similarly, a user's computing device may instruct the text savings platform 120 to save a lower amount by sending a text message with the words "Save Less." When the text savings platform 120 receives the text message, the auto-savings module 325 determines a transfer amount using a lower tier, for example, Tier 2.

In FIG. 3, an additional savings module 330 allows the text savings platform 120 to transfer additional amounts from the user's first account to the user's second account. In some embodiments, a user's computing device, such a mobile device, sends a text message to another computing device, such as the text savings platform 120, to instruct or command the other computing device to save an additional amount. For example, a user's computing device may send a text message with the words "Save Now 50" to the text savings platform 120. When the text savings platform 120 receives the text message, the additional savings module 330 may immediately transfer, for example, $50 from the user's first account to the user's second account. When an additional amount is transferred from a user's first account to the user's second account, the text savings platform 120 may send a text message to the user's computing device to inform the user that the transaction has been completed.

Communication module 335 facilitates communication (e.g., in the form of data, such as text messages) with users' computing devices 110A-110M (e.g., through mobile application programs, or desktop application programs).

An information retrieval module 340 allows the text savings platform 120 to provide information to the user. In some embodiments, the user requests information from the text savings platform 120. For example, as shown in FIG. 10, the user's computing device can send text messages to the text savings platform 120 to request a first account balance, a second account balance, the last amount transferred, a list of amounts transferred, a list of commands understood by the second computing device, and a total amount saved using, for example, the text savings plan. In some embodiments, a user's computing device may send the text message with the word "Help" to the text savings platform 120. In response, the text savings platform 120 may send back a list of commands understood by the text savings platform 120. In an embodiment, the text savings platform 120 may send the user's checking account balance and savings account balance when the user's computing device sends text messages with the words "Checking" and "Savings," respectively. Similarly, the user's computing device may send text messages, such as "Total Saved," "Last Transfer," and "History" to receive from the text savings platform the total amount saved by the text savings plan, the last amount transferred, and a list of amounts transferred, respectively. In some embodiments, a user's computing device can send the text messages "Text Off" or "Text On" which turn the daily text messages off and on, respectively, while continuing the automatic transfers. Additional examples of commands received from the first computing device and responses received by the first computing device from the second computing device are provided in FIG. 10.

Figure 11:
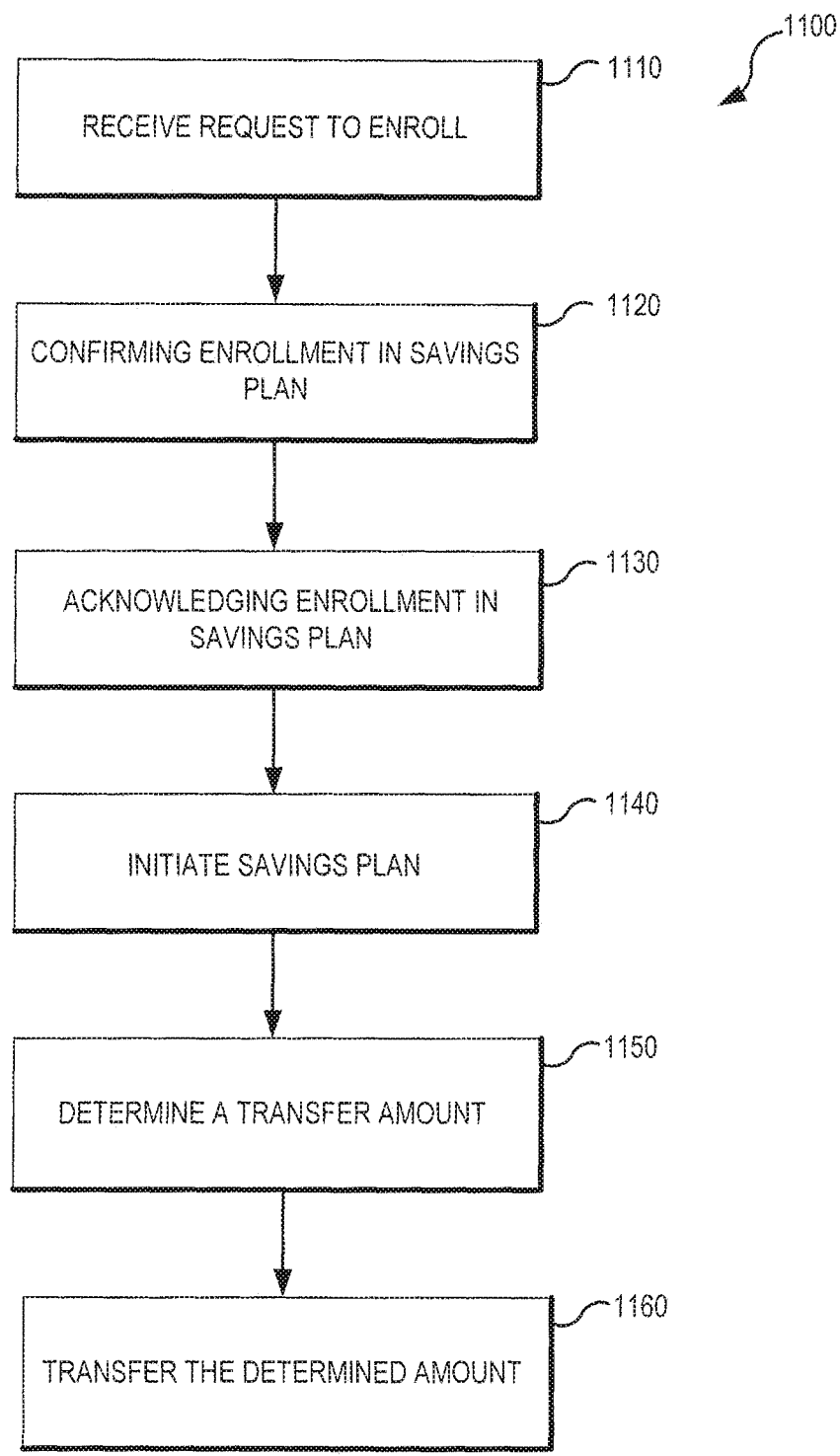
FIG. 11 illustrates an example of a flowchart for transferring funds into an account.

FIG. 11 illustrates a flowchart 1100 for transferring funds into an account. In some embodiments, fewer than all of the operations in each set of operations are performed, whereas in other embodiments additional operations are performed. Moreover, in some embodiments, the operations may be performed in different orders or in parallel. The operations can be performed by various components of text savings platform 120 such as those illustrated in FIG. 3.

In receiving operation 1110, a second computing device may receive from a user's computing device a response to initiate enrollment in a savings plan. In confirming operation 1120, a first computing device may transmit at least one text message to the second computing device to confirm the user's enrollment in the savings plan. In acknowledging operation 1130, the second computing device sends a text message that is received and displayed by the first computing device to acknowledge the user's enrollment in the savings plan. In initiating operation 1140, the second computing device can initiate the savings plan for the user. In determining operation 1150, the second computing device can determine an amount of money to transfer from a first account to a second account. The second computing device can periodically determine the amount to transfer. Further, the second computing device can determine the amount to transfer based on a balance of the user's first account. In some embodiments, if an account balance of the first account is below a predetermined amount, for example, $100, the second computing device may not transfer any amount from a first account to the second account to protect the user from a potential overdraft. In transferring operation 1160, the determined amount is transferred from the first account to the second account. The second computing device may periodically transfer the determined amount.

Computer System Overview

Figure 12:
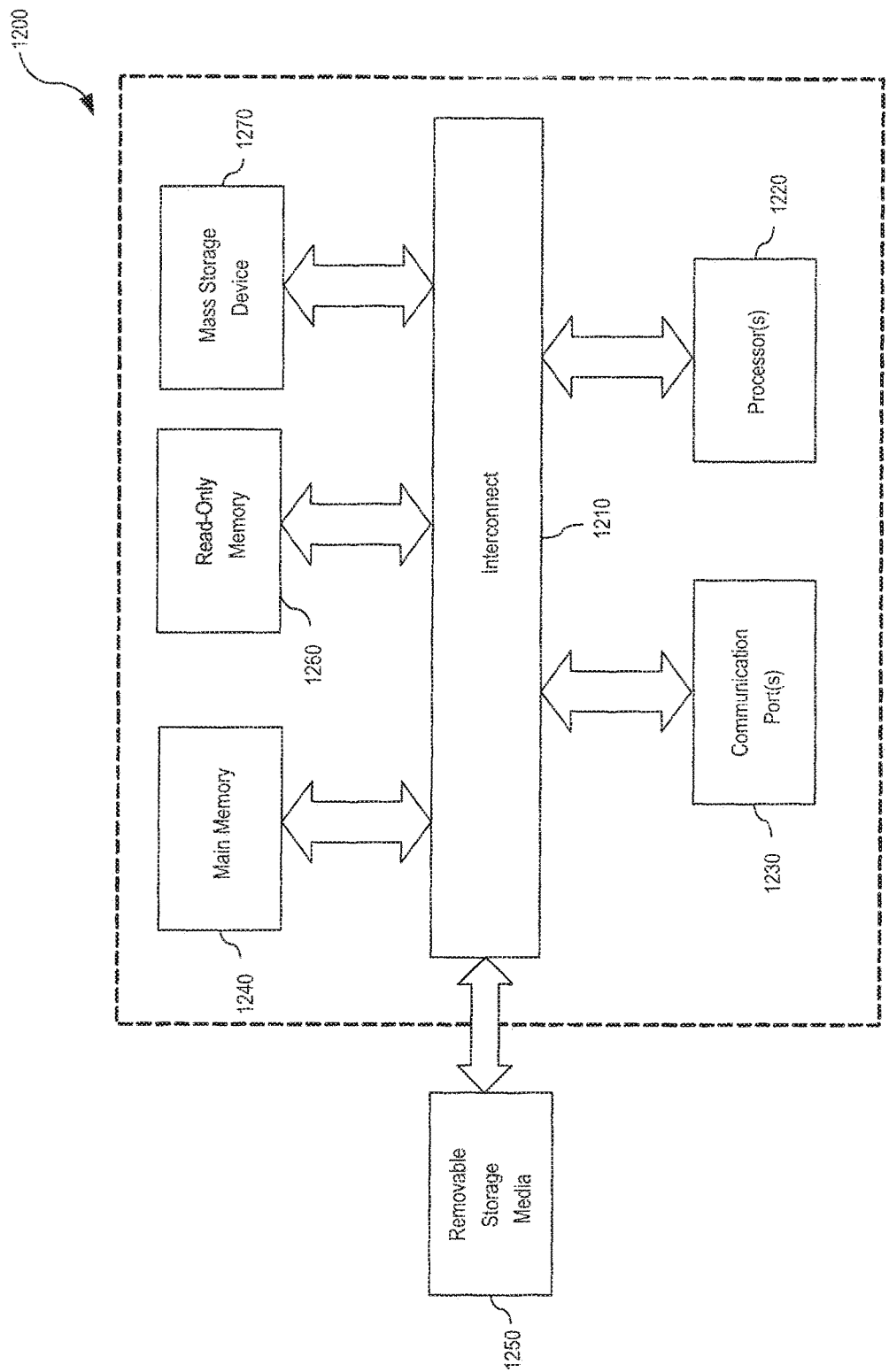
FIG. 12 illustrates an example of a computer system with which some embodiments of the present disclosure may be used.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 12 is an example of a computer system 1200 with which embodiments of the present disclosure may be utilized. According to the present example, the computer system 1200 includes an interconnect 1210, at least one processor 1220, at least one communication port 1230, a main memory 1240, a removable storage media 1250, a read-only memory 1260, and a mass storage device 1270.

Processor(s) 1220 can be any known processor, such as, but not limited to, an Intel® Itanium® or Itanium 2® processor(s), or AMD® Opteron® or Athlon MP® processor(s), or Motorola® lines of processors. Communication port(s) 1130 can be a RS-232 port for use with a modem-based dial-up connection, a 10/100 Ethernet port, or a Gigabit port using copper or fiber. Communication port(s) 1130 may be chosen depending on the type of network such as a Local Area Network (LAN), Wide Area Network (WAN), or any network to which the computer system 1200 connects.

Main memory 1240 can be random access memory (RAM) or any other dynamic storage device(s) commonly known in the art. Read-only memory 1260 can be any static storage device(s) such as programmable read-only memory (PROM) chips for storing static information, such as instructions for processor(s) 1220.

Mass storage device 1270 can be used to store information and instructions. Mass storage devices that may be used include hard disks such as the Adaptec® family of SCSI (small computer system interface) drives, optical discs, an array of discs such as RAID (redundant array of independent disks), the Adaptec® family of RAID drives, or any other mass storage device.

Interconnect 1210 communicatively couples processor(s) 1220 with the other memory, storage, and communication blocks. Depending on the storage devices used, interconnect 1210 can be a PCI/PCI-X- or SCSI-based system bus.

Removable storage media 1250 can be any type of external hard drive, floppy drive, IOMEGA® Zip Drives, compact disc read-only memory (CD-ROM), compact disc re-writable (CD-RW), and/or digital video disc read-only memory (DVD-ROM).

The components described above are meant to exemplify some types of possibilities. In no way should the aforementioned examples limit the disclosure, as they are only exemplary embodiments.

For purposes of explanation and illustration, the terms "application" and "application program" are generally synonymous. Further, these terms are applicable to applications running on any kind of device (e.g., a desktop application running on a desktop computer or on a laptop computer). Similarly, a "mobile application" applies to software running on mobile devices. Accordingly, such distinctions will be understood to be clear from the context of usage of the terms "application" or "application program." Additionally, for discussion purposes herein, the terms "entity" and "organization" are considered synonymous. In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of medium/machine-readable medium suitable for storing electronic instructions.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

What is claimed is:

1. A computing system for text message-based enrollment in an automatic fund transfer plan, the computing system comprising:
   one or more processors; and
   one or more memories storing instructions that, when executed by the one or more processors, cause the computing system to perform a process comprising:
      receiving from a user a text message to initiate a text message-based enrollment of the user in a savings plan;
      transmitting at least one text message, from a first computing device to a second computing device, confirming the user's text message-based enrollment in the savings plan;
      initiating, in response to the text message-based enrollment, the savings plan for the user, wherein the savings plan performs automated transfers with no activity required from the user beyond the text message-based enrollment, wherein the automated transfers include:
         determining, based on a balance of a first account, an amount to transfer from the first account to a second account by:
            determining a base transfer amount based on a tier associated with the balance of the first account;
            determining a random amount based on a random number generation; and
            computing the amount to transfer by adding to or subtracting from, the base transfer amount, the random amount; and
         transferring the determined amount from the first account to the second account, wherein the transferring is automatically performed with no activity required from the user beyond the text message-based enrollment.

2. The system of claim 1, wherein determining the amount to transfer includes a plurality of tiers associated with a plurality of ranges of account balances, wherein
   each tier corresponds to a different range of account balance, and
   each tier includes a different base transfer amount combined with the random amount.

3. The system of claim 2, wherein the process further comprises:
sending, from the first computing device to the second computing device, a text message to instruct the second computing device to perform one or more of increase the amount transferred by one tier, and decrease the amount transferred by one tier.

4. The system of claim 1, wherein the transfer amount is determined and transferred periodically up to a predetermined number of times during a period of time, wherein the second account is one of a savings account, a credit card account, or a payee account.

5. The system of claim 1, wherein the process further comprises:
transferring an additional amount from the first account to the second account, wherein the additional amount is transferred based on an additional text message received from the first computing device.

6. The system of claim 1, wherein the process further comprises:
sending, from the first computing device to the second computing device, text messages to request the second computing device to provide one or more of a total amount saved, a first account balance, a second account balance, a last amount transferred, a list of amounts transferred, and a list of commands understood by the second computing device.

7. The system of claim 1, wherein the process further comprises:
disenrolling the user from the savings plan based on a text message received from the first computing device.

8. A machine-readable storage medium having machine executable instructions stored thereon that, when executed by one or more processors, direct the one or more processors to perform a method for text message-based enrollment in an automatic fund transfer plan, the method comprising:
receiving a first text message to initiate a text message-based enrollment of a user in a savings plan;
sending, by the second computing device, a second text message to a first computing device to acknowledge the text message-based enrollment of the user in the savings plan; and
in response to the text message-based enrollment, initiating the savings plan for the user, wherein the savings plan performs automated transfers with no activity required from the user beyond the text message-based enrollment, and wherein the automated transfers include:
determining, based on a balance of a first account, an amount to transfer from a first account to a second account by:
determining a base transfer amount based on a tier associated with the balance of the first account;
determining a random amount based on a random number generation; and
computing the amount to transfer by adding to or subtracting from, the base transfer amount, the random amount; and
transferring the determined amount from the first account to the second account, wherein the transferring is automatically performed with no activity required from the user beyond the text message-based enrollment.

9. The machine-readable storage medium of claim 8, wherein the method further comprises:
determining the amount to transfer based on a plurality of tiers.

10. The machine-readable storage medium of claim 9, wherein the method further comprises:
performing one or more of increasing the amount transferred by one tier, and decreasing the amount transferred by one tier in response to receiving the plurality of text messages.

11. The machine-readable storage medium of claim 8, wherein the transfer amount is determined and transferred periodically up to a predetermined number of times during a period of time.

12. The machine-readable storage medium of claim 8, wherein the method further comprises:
transferring an additional amount from the first account to the second account, wherein the additional amount is transferred based on receiving an additional text message.

13. The machine-readable storage medium of claim 8, wherein the method further comprises:
sending, from the first computing device to the second computing device to request the second computing device to provide one or more of a total amount saved, a first account balance, a second account balance, a last amount transferred, a list of amounts transferred, and a list of commands understood.

14. The machine-readable storage medium of claim 8, wherein the method further comprises:
disenrolling the user from the savings plan based on a received text message.

15. A method for text message-based enrollment in an automatic fund transfer plan, the method comprising:
receiving, at a second computing device, a first text message to initiate a text message-based enrollment of a user in a savings plan; and
in response to the text message-based enrollment, initiating, by the second computing device, the savings plan for the user, wherein the savings plan performs automated transfers with no activity required from the user beyond the text message-based enrollment, and wherein the automated transfers include:
determining, based on a balance of a first account, an amount to transfer from a first account to a second account by:
determining a base transfer amount based on a tier associated with the balance of the first account;
determining a random amount based on a random number generation; and
computing the amount to transfer by adding to or subtracting from, the base transfer amount, the random amount; and
transferring the determined amount from the first account to the second account, wherein the transferring is automatically performed with no activity required from the user beyond the text message-based enrollment.

16. The method of claim 15, wherein the amount to transfer is determined based on a tier associated with the balance of the first account.

17. The method of claim 16, further comprising:
in response to receiving a text message from the first computing device, performing one or more of increasing the amount transferred by one tier and decreasing the amount transferred by one tier.

18. The method of claim 15, wherein the determining and transferring of the amount is performed periodically up to a predetermined number of times during a period of time.

19. The method of claim 15, further comprising:
transferring an additional amount from the first account to the second account in response to receiving an additional text message from the first computing device.

20. The method of claim 15, further comprising:
in response to receiving a request from the first computing device, transmitting text messages from the second computing device to the first computing device with one or more of a total amount saved, a first account balance, a second account balance, a last amount transferred, a list of amounts transferred, and a list of commands understood by the second computing device.

* * * * *